Oct. 7, 1930.                W. E. HOLLAND                1,777,436
                 CHARGE INDICATOR FOR STORAGE BATTERIES
                     Filed Feb. 9, 1925     3 Sheets-Sheet 1
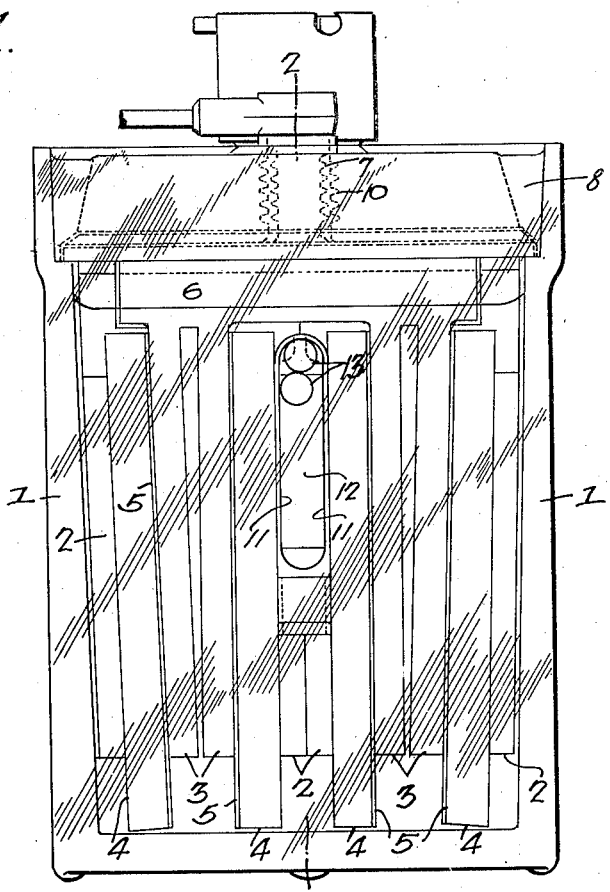
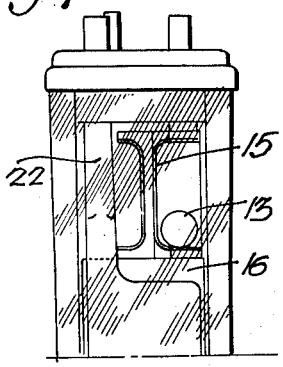 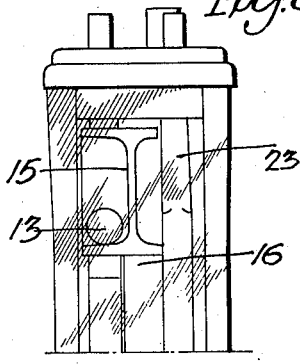 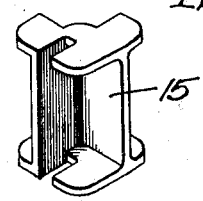
Inventor-
Walter E. Holland.
by his Attorneys-
Howson & Howson.

Oct. 7, 1930.  W. E. HOLLAND  1,777,436
CHARGE INDICATOR FOR STORAGE BATTERIES
Filed Feb. 9, 1925  3 Sheets-Sheet 2
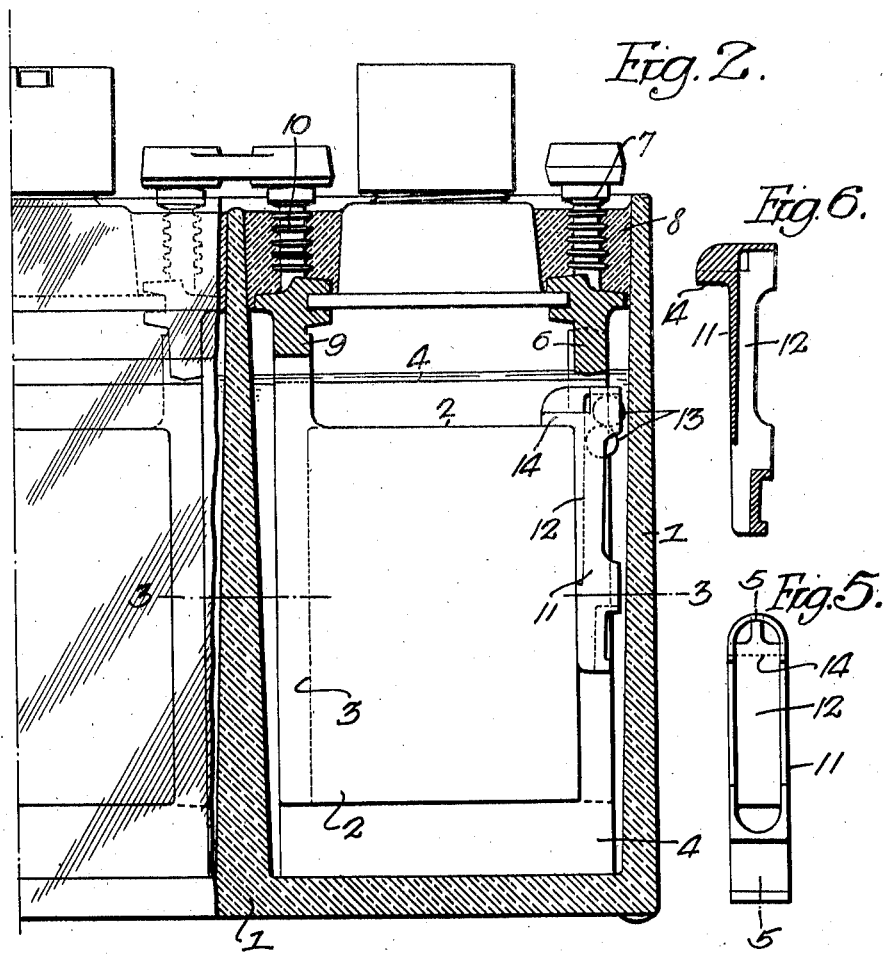
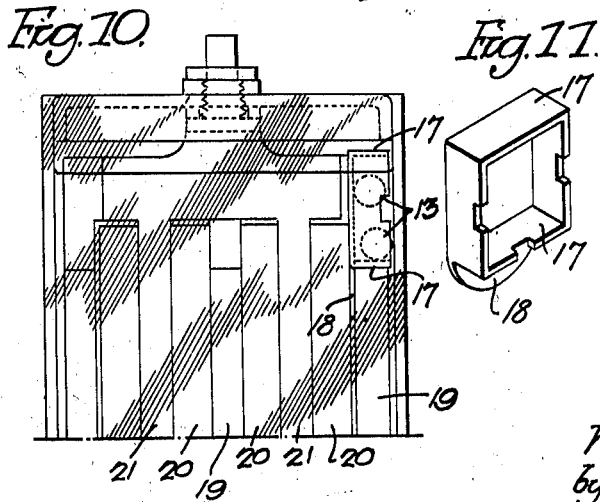
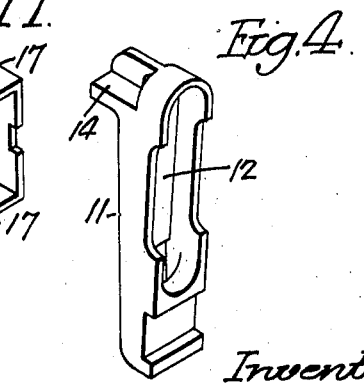
Inventor:—
Walter E. Holland.
by his Attorneys:—
Howson + Howson Oct. 7, 1930. W. E. HOLLAND 1,777,436
CHARGE INDICATOR FOR STORAGE BATTERIES
Filed Feb. 9, 1925  3 Sheets-Sheet 3

Inventor
Walter E. Holland.
by his Attorneys.—
Howson + Howson.

Patented Oct. 7, 1930

1,777,436

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

CHARGE INDICATOR FOR STORAGE BATTERIES

Application filed February 9, 1925. Serial No. 7,875.

One object of this invention is to provide a battery cell having simple and reliable means for automatically indicating visibly the state of charge or discharge.

Another object of the invention is to provide a battery cell having a reliable built-in indicator actuated by the specific gravity changes of the electrolyte and located in the normal field of circulation of the electrolyte whereby there may be an accurate indication of the state of charge or discharge.

A further object of the invention is to provide an indicating device which is supported by the battery elements in a predetermined position visible through a transparent part of the container.

More specifically, the invention contemplates the provision within a transparent jar or container, or jar having a transparent part, of means for holding one or more balls or elements of predetermined density in a position clearly visible through the jar, and so that they are free to move vertically through a limited distance and are exposed to circulation of the electrolyte.

The invention further resides in certain novel structural features and details of the device as hereinafter described and as illustrated in the attached drawings, in which:

Figure 1 is an end elevation of a battery provided with an indicator made in accordance with my invention;

Fig. 2 is a fragmentary section on the line 2—2, Fig. 1;

Fig. 4 is a view in perspective of that form of indicator cage illustrated in Figs. 1 and 2;

Fig. 5 is a front elevation of the cage;

Fig. 6 is a vertical section on the line 5—5, Fig. 4;

Figs. 7 and 8 are, respectively, end and side elevations of the upper portion of a battery cell provided with a modified form of my device;

Fig. 9 is a view in perspective of the cage of the indicator illustrated in Figs. 6 and 7;

Fig. 10 is a side elevation of a cell equipped with a modified form of indicator within the scope of the invention;

Fig. 11 is a view in perspective of the cage of the indicator illustrated in Fig. 9.

Figure 3:
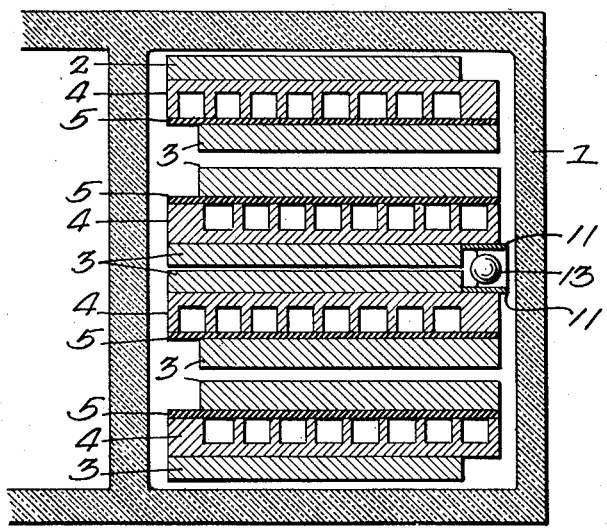
Fig. 3 is a section on the line 3—3, Fig. 2.

In Figs. 1 and 2, I have shown my device applied to a storage cell or battery comprising the usual container 1, which in the present instance is made of glass and which houses the usual active battery plates 2 and 3 of opposite polarity insulated from each other by separators 4 and 5. As shown in Figs. 1 and 2, the plates 3 are suspended from a strap 6 from which a terminal post 7 extends upwardly through the cover sealing 8 of the cell, while a similar strap 9 carries the plates 2 of opposite polarity and has extending upwardly therefrom a terminal post 10 which also projects at the top above the sealing material 8.

My device in its preferred form consists of a suitable cage immersed in the electrolyte and containing at least one ball of predetermined density and of material insoluble in the electrolyte, the cage being so formed as to permit limited movement of the ball or balls therein. In order to obtain an accurate indication of the state of charge, it is essential that the cage be so designed and positioned that the indicating parts are kept out of contact with the active material of the battery plates and yet are exposed to the free normal circulation of the electrolyte around the said plates. I have found it particularly advantageous to associate the cage with the plates themselves in such manner that the plates or their insulating separators constitute a support or mounting for the cage. This not only has the advantage of insuring the exposure of the indicator to the normal circulation of the electrolyte, but provides an easy means for installing the indicator in the cell, the indicator being insertible with the plates which ordinarily with the insulators are assembled and introduced as a unit prior to the sealing of the top of the container.

With reference to Figures 1 to 6, inclusive, the cage may consist of a properly formed body 11 of electrolyte-resisting material such as hard rubber, glass or porcelain having a vertical channel 12 for the ball or balls 13. In the present instance, I form the cage 11 with a rearwardly extending shoulder 14 at the top which is of a width not exceeding the combined thickness of the plates 2 whereby the said shoulder 14 may extend between the insulators 4 on either side of said plates and rest upon the tops of the latter. In the present instance, as shown in Figs. 1 and 2, the entire cage lies between the protruding portions of the insulators and is kept from moving down or up by the interaction of the top of the plates 2 and of the bottom of the straps 6. As previously stated, the container 1 in the present instance is of glass, and the front of the cage 11 lies close against one of the walls of the container whereby the wall confines the balls to the recess 12. Obviously the position of the balls in the cage is clearly discernible through the transparent wall and the balls are held away from the plates where there is little likelihood of their becoming coated with particles of active material.

The cage may vary widely as to form and as to position in the container, it being only necessary that the cage be submerged in the electrolyte so that the latter may contact with the indicating ball or balls. To a large extent, the cage will vary in form in accordance with the nature of the cell with which it is used. For example as shown in Figs. 7, 8 and 9, I have found it to advantage in instances where the cell is small and the space correspondingly restricted, to so form and apply the cage that it lies in a corner of the container. As shown, the cage 15 in this instance, as in the cage previously described, is supported by the battery elements, resting in the present instance upon the top of one of the separators or insulators 16 and being kept from moving away from the walls of the container by the plate lugs or posts 22 and 23.

Figure 12:
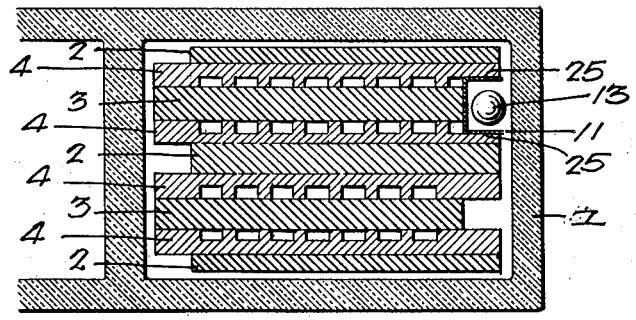
Fig. 12 is a horizontal section illustrating a further modification within the scope of the invention.

Still another form of the device within the scope of the invention is illustrated in Figs. 10 and 11. In this instance, the cage comprises a substantially rectangular box 17, open on one face and preferably provided at the bottom and rear with a depending flange or web 18. In this instance, the cage is applied by inserting the flange 18 between one of the outside plates 19 and the separator 20 which insulates the said plate 19 from the plate 21 of opposite polarity. The bottom of the cage 17 may rest upon the top of the plate 19, and the balls 13 are retained in the cage by the transparent wall of the container which houses the elements. The cage in this instance is of sufficient width to permit the balls 13, 13, to move in independent vertical channels. In each instance, the walls of the cages are sufficiently open to insure the free circulation of the electrolyte around the indicating balls.

Where single plates are employed, as shown in Fig. 12, instead of the double plate construction illustrated in the other figures of the drawings, the separators, which in this instance are single, may be cut away at the ends, as indicated at 25, to provide room for the cage, the latter being generally of the same type as that in Figs. 1, 2 and 3. In Fig. 12, the parts have been designated by the reference numerals used for the corresponding parts in Fig. 3.

Obviously, it is unimportant whether the cage is supported directly upon one of the battery plates or upon a plate separator, and where in the claims the elements are named as a support for the indicating means, the expression will be understood as referring to either the plates or the separators. The invention, however, is not limited to supporting the cage from the elements, and since the form of ball retainer may vary largely, this term is to be construed broadly as any means for confining the ball or balls while permitting the vertical movement of the latter required for their indicating function. Also, it is immaterial whether the container be transparent throughout or only in that portion opposite the indicator, and the claims are to be construed as comprehending either alternative.

While this indicating device is particularly useful when applied to the common lead-sulfuric acid storage battery, it is also appropriate for and may be used to advantage in any kind of electrolytic cell in which the specific gravity of the electrolyte changes during operation. It may be applied, for instance, to the well known type of primary battery cell which has zinc negative plates and a caustic potash or caustic soda electrolyte. In this type of cell, the specific gravity of the electrolyte increases as the discharge proceeds instead of decreasing as in the case of the lead-sulfuric acid cell, and the indication of a cell becoming discharged would therefore be given by the rising or floating, instead of the sinking, of one or more balls.

I claim:

1. A battery cell comprising a container having a transparent wall, a ball of predetermined density and of material insoluble in the electrolyte, and means for confining said ball for vertical movement behind said transparent wall including a cage having rear and side vertical walls and arranged with its open front side adjacent said transparent wall of the container, ports in the rear wall adjacent the top and bottom respectively, and the front edges of said side walls being recessed, all providing for substantially free circulation of electrolyte through the cage.

2. A battery cell comprising a container, battery elements housed in said container, and charge indicating means carried by said elements.

3. A battery cell comprising a container having a transparent wall, positive and negative plates and insulators therefor insertible as a unit into the container, and charge indicating means carried by said unit and visible through said transparent wall.

4. A battery cell comprising a container having a transparent wall, battery elements housed in said container, and charge indicating means carried by the elements and visible through the transparent wall.

5. A battery cell comprising a container for electrolyte and for the battery elements, said container having a transparent wall, a cage carried by said elements, and at least one ball of predetermined density and of material insoluble in the electrolyte having vertical movement in said cage and visible through the transparent wall.

6. A battery cell comprising a container for electrolyte having a transparent wall, battery elements in said container, a cage having an open front supported behind said wall, means including said wall and the battery elements for preventing dislodgment of said cage, and at least one ball of predetermined density and of material insoluble in the electrolyte confined by the walls of said cage and by said transparent wall of the container.

7. A battery cell comprising a container having a transparent wall, positive and negative plates and insulators therefor housed in said container, a cage of insulating material having a vertical channel, a rearwardly extending flange adapted to extend over the top of one of said plates to thereby support the cage, and at least one ball of predetermined density and of material insoluble in the electrolyte confined in the said vertical channel of the cage and visible through the transparent wall.

8. A battery cell comprising a container, plates of opposite polarity established in said container with the plates of one polarity arranged in transversely staggered relation with the plates of the opposite polarity, spacing elements for insulating the plates of opposite polarity, and a charge indicator mounted in the recess between the edge of one of said plates and the wall of the container.

9. A battery cell comprising a container, plates of opposite polarity established in said container with the plates of one polarity arranged in transversely staggered relation with the plates of the opposite polarity, spacing elements for insulating the plates of opposite polarity, and a charge indicator mounted in the recess between the edge of one of said plates and the wall of the container and supported by the plate assembly above the bottom of the container.

10. A battery cell comprising a container, plates of opposite polarity established in said container with the plates of one polarity arranged in transversely staggered relation with the plates of the opposite polarity, spacing elements for insulating the plates of opposite polarity, and a charge indicator mounted in the recess between the edge of one of said plates and the wall of the container and comprising a transversely extending part overlying and resting upon the top of said plate and supporting the indicator in the container.

11. A battery cell comprising a container having at least one transparent wall, plates of opposite polarity established in said container with the plates of one polarity arranged in transversely staggered relation with the plates of the opposite polarity, spacing elements for insulating the plates of opposite polarity, a charge indicator comprising at least one indicating member of predetermined density and of material insoluble in the electrolyte, and a cage for said member having rear and side vertical walls and mounted in the recess between the edge of one of said plates and the transparent wall of the container with its open front side closely adjacent said wall.

12. A storage battery composed of a jar having a battery element therein, and a gravity indicator formed independently of the jar and supported by the battery element independently of said jar.

13. A storage battery composed of a jar and a battery element therein, and a gravity indicator composed of a chamber adapted to be provided with one or more indicating elements and provided with a supporting extension engaging the battery element.

14. A storage battery cell composed of a jar adapted to be provided with electrolyte and containing a battery element, and a gravity indicator composed of a slotted chamber having one or more indicating devices and supported from the element independently of the jar.

WALTER E. HOLLAND.